UNITED STATES PATENT OFFICE.

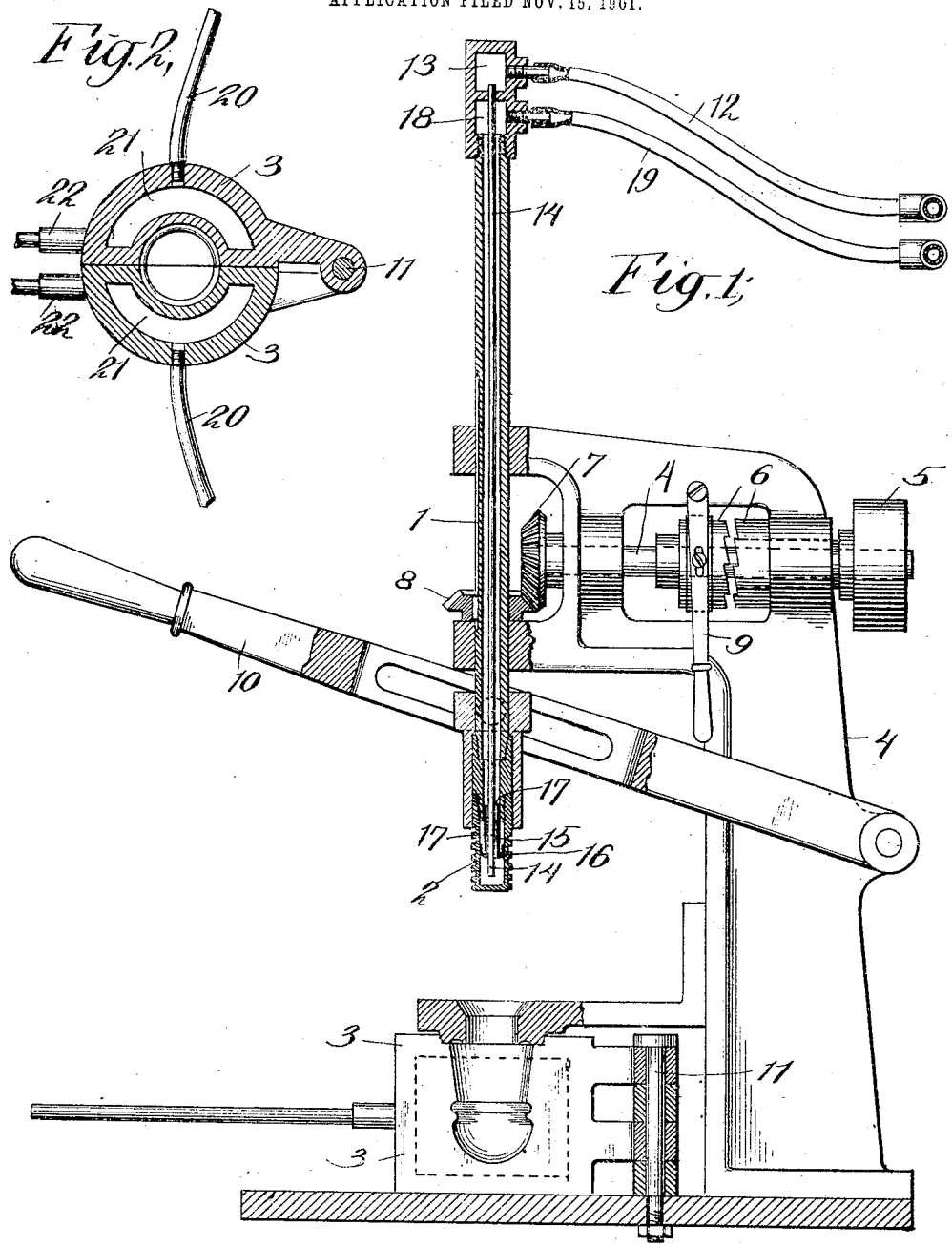

HENRY M. BROOKFIELD, OF NEW YORK, N. Y.

PROCESS FOR MOLDING GLASS.

No. 835,393.

Specification of Letters Patent.

Patented Nov. 6, 1906.

Application filed November 15, 1901. Serial No. 82,367.

*To all whom it may concern:*

Be it known that I, HENRY M. BROOKFIELD, a citizen of the United States, and a resident of the city, county, and State of New York, have invented certain new and useful Improvements in Processes for Molding Glass, of which the following is a specification.

My invention relates to processes for cooling apparatus used in molding glass articles with which the molten glass comes into contact, and is especially adapted for cooling apparatus used continuously in molding glass insulators and similar articles.

It is well known that in molding glass insulators or other similar glass articles in which molten glass is being constantly and freshly supplied to the molding parts and in which the glass and molding parts are kept in contact with each other until the insulator or other glass article sets the said molding parts are apt to become too hot. As a result the molten glass is apt to stick to such molding parts—as, for example, in a press for making screw insulators the glass is apt to stick to the screw or mold. In such case the glass insulators or other articles will either be broken or imperfect and will be unfit for use. To overcome this, it has been attempted to employ cooling media of different kinds—such as, for example, cold water or cold air or hot water or heated air introduced into the interior of the molding parts. In no case, however, prior to my invention, as far as I know or am informed, has such an attempt been successful. Either the molding parts are cooled too much—as, for example, when cold water is employed—or they are not cooled sufficiently. Where the molding parts are cooled too much or too rapidly, the results are as disastrous, if not more so, than where the molding parts remain too highly heated. In the actual manufacture of glass insulators as practiced at and prior to the time of my invention the screw plungers used in presses for making glass insulators are maintained at a proper temperature only by making the screws detachable from the plunger and using a relatively large number of such screws and by varying the number used to suit the varying conditions at the time of manufacture. This gives the screws time to cool sufficiently before they are employed in the next molding operation, and by varying the number this cooling is varied to suit different conditions—as, for example, varying temperatures of the glass. Never prior to my invention, so far as I am aware, has it been possible to successfully employ the same screws and the same number of screws continuously and successively in an automatic press for making glass insulators.

I have discovered that by the use of steam continuously introduced into the interior of the molding parts—such, for instance, as the plunger and screw or the mold of a press for making glass insulators—an even and suitable temperature is secured and maintained in the molding parts. The said parts are cooled sufficiently to prevent the sticking of the glass while prevented from growing too cold, and thereby cracking the glass or other glass article. Glass insulators made in a press where my said invention is employed are not broken, and they do not stick to the molding parts.

I am also aware that the use of steam has been suggested in connection with ladles for dipping and pouring molten glass and for the hollow interiors of cylinders for rolling heavy plates of glass; but in neither of these cases are the articles produced or the conditions, problems, or uses at all analogous to those obtaining in connection with the manufacture of glass insulators or similar glass articles, and in neither of them is there employed a continuous circulation of steam.

In the drawings accompanying this specification and forming a part hereof I have shown one form of apparatus by means of which my improved process can be applied in the making of glass insulators.

Referring to the said drawings, Figure 1 represents the plunger and its screw and a mold of a press for making glass insulators and certain of the connecting parts, some of the parts being shown in section. Fig. 2 is a horizontal cross-section through the mold.

Referring to the specific apparatus shown in the drawings, 1 represents the plunger, and 2 the screw mounted on its lower end, and 3 represents a mold for molding glass insulators. Plunger 1 is suitably mounted on the framework 4 of the press. A rotary motion is imparted to it through a pulley 5, clutch 6, and gears 7 and 8, lever 9 being for the purpose of throwing the parts of the clutch together or of separating them.

10 is an ordinary lever for lowering and raising plunger 1.

The particular arrangement of clutch here shown forms no part of the present invention and is not claimed herein, but is not abandoned, as it is the intention to make it the subject-matter of another application.

Mold 3 is composed of two parts pivoted at 11 and opens and closes in the usual way. In the form of devices shown I apply steam to the plunger and screw and to the mold, preferably to their interiors. As shown, the steam enters from pipe 12 into chamber 13 at the top of the plunger and thence passes down through pipe 14 into the lower part of screw 2, cooling the screw and maintaining it at the desired temperature.

15 is a sleeve screw-threaded on its exterior and screwing into screw-threads on the interior of the lower part of plunger 1. At its lower end sleeve 15 is cap-shaped, as at 16, the cap completely filling the hollow space inside of screw 2 around pipe 14 and forming a bulkhead to prevent the escaping of the steam upward into the upper part of screw 2 except through the openings 17 through sleeve 15. These openings 17 open into the hollow space inside of plunger 1 above sleeve 15. These openings 17 permit the steam to escape into the interior of the plunger, to pass therefrom into chamber 18, near the upper part of the plunger, and thence to escape as waste steam through pipe 19.

The particular construction of the sleeve 15 and its bulkhead forms no part of the present invention and is not claimed herein; but it is not abandoned, as it is the intention to make it the subject-matter of another application.

Steam is applied to each half of the mold 3 by means of a pipe 20, connecting with the hollow space 21 inside of the mold, the waste steam escaping through pipe 22.

When it is desired to start up the press to make glass insulators or other articles, the steam is first turned on and the molding parts are heated before the molding of the glass insulators or other articles is begun. In this way the press can be started at once to make merchantable articles. The first insulators or other articles made upon the press are not broken, as has always heretofore been the case, but are made perfectly and in a merchantable condition. A considerable saving is thereby effected.

My improved process is of particular value in connection with the screw and the mold of a press for making glass insulators, although it is not limited in its scope to such use, but may be applied to any molding devices for molding or blowing glass articles which come directly into contact with the molten glass and are of such a nature that the molding parts must be kept heated at a fixed temperature, but less than that of the molten glass.

What I claim as new, and desire to secure by Letters Patent, is—

1. The method of molding glass insulators or similar glass articles from molten glass which consists in bringing batches of molten glass successively and continuously, one after another, into direct contact with the same molding parts, molding the said insulators in such parts, removing the molded insulator therefrom after each molding operation, and applying a continuous circulation of steam to the interior of the molding parts during the molding operation to maintain such parts at the proper temperature.

2. The method of molding glass insulators or similar glass articles from molten glass which consists in bringing batches of molten glass successively and continuously, one after another, into direct contact with the molding parts of a press for making glass insulators, including the screw of the plunger of such press, molding the insulators in such molding parts, removing the molded insulator therefrom after each molding operation, and applying a continuous circulation of steam to the interior of the screw plunger during the molding operation to maintain said screw at the proper temperature.

3. The method of molding glass insulators or similar glass articles from molten glass which consists in bringing batches of molten glass successively and continuously, one after another, into direct contact with the mold of a press for making glass insulators, molding the insulators in such mold, removing the molded insulator therefrom after each molding operation, and applying a continuous circulation of steam to the interior of the mo d during the molding operation to maintain the mold at the proper temperature.

In testimony whereof I have signed my name to this specification in the presence of two subscribing witnesses.

HENRY M. BROOKFIELD.

Witnesses:
 EDWIN SEGER,
 JOHN O. GEMPLER.